US012574522B2

(12) United States Patent     (10) Patent No.:   US 12,574,522 B2

Bordes et al.     (45) Date of Patent:   Mar. 10, 2026

---

(54) METHODS AND APPARATUS FOR DMVR WITH BI-PREDICTION WEIGHTING

(71) Applicant: InterDigital CE Patent Holdings, SAS, Paris (FR)

(72) Inventors: Philippe Bordes, Cesson-Sevigne (FR); Ya Chen, Cesson-Sevigne (FR); Franck Galpin, Cesson-Sevigne (FR); Fabrice Le Leannec, Cesson-Sevigne (FR); Antoine Robert, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/692,304

(22) PCT Filed: Sep. 23, 2022

(86) PCT No.: PCT/EP2022/076564

§ 371 (c)(1),
(2) Date: Mar. 14, 2024

(87) PCT Pub. No.: WO2023/046917

PCT Pub. Date: Mar. 30, 2023

(65) Prior Publication Data

US 2025/0203092 A1    Jun. 19, 2025

(30) Foreign Application Priority Data

Sep. 24, 2021   (EP) ..................................... 21306317
Dec. 21, 2021   (EP) ..................................... 21306874

(51) Int. Cl.
*H04N 19/139*     (2014.01)
*H04N 19/513*     (2014.01)

(52) U.S. Cl.
CPC ......... *H04N 19/139* (2014.11); *H04N 19/513* (2014.11)

(58) Field of Classification Search
CPC ........................... H04N 19/139; H04N 19/513
See application file for complete search history.

(56) References Cited

U.S. PATENT DOCUMENTS

2022/0070487 A1   3/2022   Park et al.
2022/0078439 A1*   3/2022   Park ...................... H04N 19/46

FOREIGN PATENT DOCUMENTS

WO    WO2019234599 A1   12/2019
WO    WO2020184848 A1    9/2020

OTHER PUBLICATIONS

Yu, R. et al., "Non-CE9: On DMVR and GBI", Joint Video Experts Team (JVET) of ITU-T SG 16 WP 3 and ISO/IEC JTC 1/SC 29/WG 11, Document: JVET-No. 153, 14th Meeting: Geneva, CH, Mar. 19-27, 2019 (Year: 2019).*

(Continued)

*Primary Examiner* — Jeremiah C Hallenbeck-Huber
(74) *Attorney, Agent, or Firm* — Smadar Gefen

(57) ABSTRACT

Embodiments disclosed herein generally relate to methods and apparatuses for video coding. For example, methods and apparatuses using decoder-side motion vector refinement (DMVR) technique with bi-prediction weighting for video coding are provided. In an example, a method for video coding includes determining a mode with an illumination change, determining that at least one coding tool for a block is enabled, and performing a DMVR process based on the mode with the illumination change and the at least one coding tool for the block being enabled.

24 Claims, 5 Drawing Sheets refPic in List L0      Current Picture      refPic in List L1

(56)         References Cited

OTHER PUBLICATIONS

Chun-Chi Chen et al., "Non-CE9.2.1.e: Non-local-mean-based MRSAD and Row-subsampled Search Pattern for DMVR", Joint Video Experts Team (JVET) of ITU-T SG 16 WP 3 and ISO/IEC JTC 1/SC 29/WG 11, 13th Meeting: Marrakech, MA, Jan. 9-18, 2019 (Year: 2019).*

Bordes (Interdigital), "Non-EE2: DMVR with BCW enabled", Document JVET-Y0089-v2, Joint Video Experts Team (JVET) of ITU-T SG 16 WP 3 and ISO/IEC JTC 1/SC 29, 25th Meeting, by teleconference, Jan. 12-21, 2022, 2 pages.

Chen et al, "Algorithm description for Versatile Video Coding and Test Model 13 (VTM 13)", Document: JVET-V2002- v1, Joint Video Experts Team (JVET) of ITU-T SG 16 WP 3 and ISO/IEC JTC 1/SC 29 22nd Meeting, by teleconference, Apr. 20-28, 2021, 104 pages.

Alexander et al.,"Bi-directional Optical Flow for Future Video Codec", Institute of Electrical and Electronics Engineers (IEEE), 2016 Data Compression Conference (DCC), SnowBird, Utah, USA, Mar. 30, 2016, 8 pages.

Coban et al., "Algorithm description of Enhanced Compression Model 2 (ECM 2)," document JVET-W2025 23rd JVET Meeting, by teleconference, Jul. 7-16, 2021.

"Versatile Video Coding", Series H: Audiovisual and multimedia systems Infrastructure of audiovisual services—Coding of moving video Recommendation ITU-T H.266 (V3) (Sep. 2023), 538 pages.

* cited by examiner

METHODS AND APPARATUS FOR DMVR WITH BI-PREDICTION WEIGHTING

CROSS REFERENCE TO RELATED APPLICATIONS

This application is a U.S. National Stage Application under 35 U.S.C. 371 of International Patent Application No. PCT/EP2022/076564, filed Sep. 23, 2022, which claims the benefit of European Patent Application Nos. 21306317.5, filed Sep. 24, 2021, and of European Patent Application No. 21306874.5, filed Dec. 21, 2021, which are all incorporated herein by reference in their entirety.

TECHNICAL FIELD

Embodiments disclosed herein generally relate to methods and apparatuses for video coding. For example, methods and apparatuses using decoder side motion vector refinement (DMVR) technique with bi-prediction weighting for video (or image) coding are provided.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video decoding is provided, comprising determining that a mode with an illumination change, determining that at least one coding tool for a current block is enabled, and performing a Decoder-side Motion Vector Refinement (DMVR) based on a determination that the mode with the illumination change and the at least one coding tool for the current block is enabled.

According to an embodiment, a method of video decoding is provided, comprising DMVR motion refinement based on gradients for modes with illumination change (IC modes) or weighting modes. According to another embodiment, a method of video decoding is provided, comprising applying a bi-prediction weighting with refined motion vector (MV). According to an embodiment, a method of video decoding is provided, comprising deriving bi-prediction weighting parameters with DMVR. According to another embodiment, a respective set of bi-prediction weighting parameters is associated with each candidate (e.g., MV candidate) of a list of candidates (e.g., MV candidates) for applying DMVR.

According to another embodiment, an apparatus for video decoding is presented, comprising one or more processors, wherein said one or more processors are configured to: determine that a mode with an illumination change, determine that at least one coding tool for a current block is enabled, and perform a decoder-side motion vector refinement (DMVR) based on a determination that the mode with the illumination change and the at least one coding tool for the current block is enabled.

According to another embodiment, an apparatus for video decoding is presented, comprising means for determining that a mode with an illumination change, means for determining that at least one coding tool for a current block is enabled, and means for performing a decoder-side motion vector refinement (DMVR) based on a determination that the mode with the illumination change and the at least one coding tool for the current block is enabled.

One or more embodiments also provide a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above.

One or more embodiments also provide a computer readable storage medium having stored thereon a bitstream generated according to the methods described above. One or more embodiments also provide a method and apparatus for transmitting or receiving the bitstream generated according to the methods described above.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Figure 1:
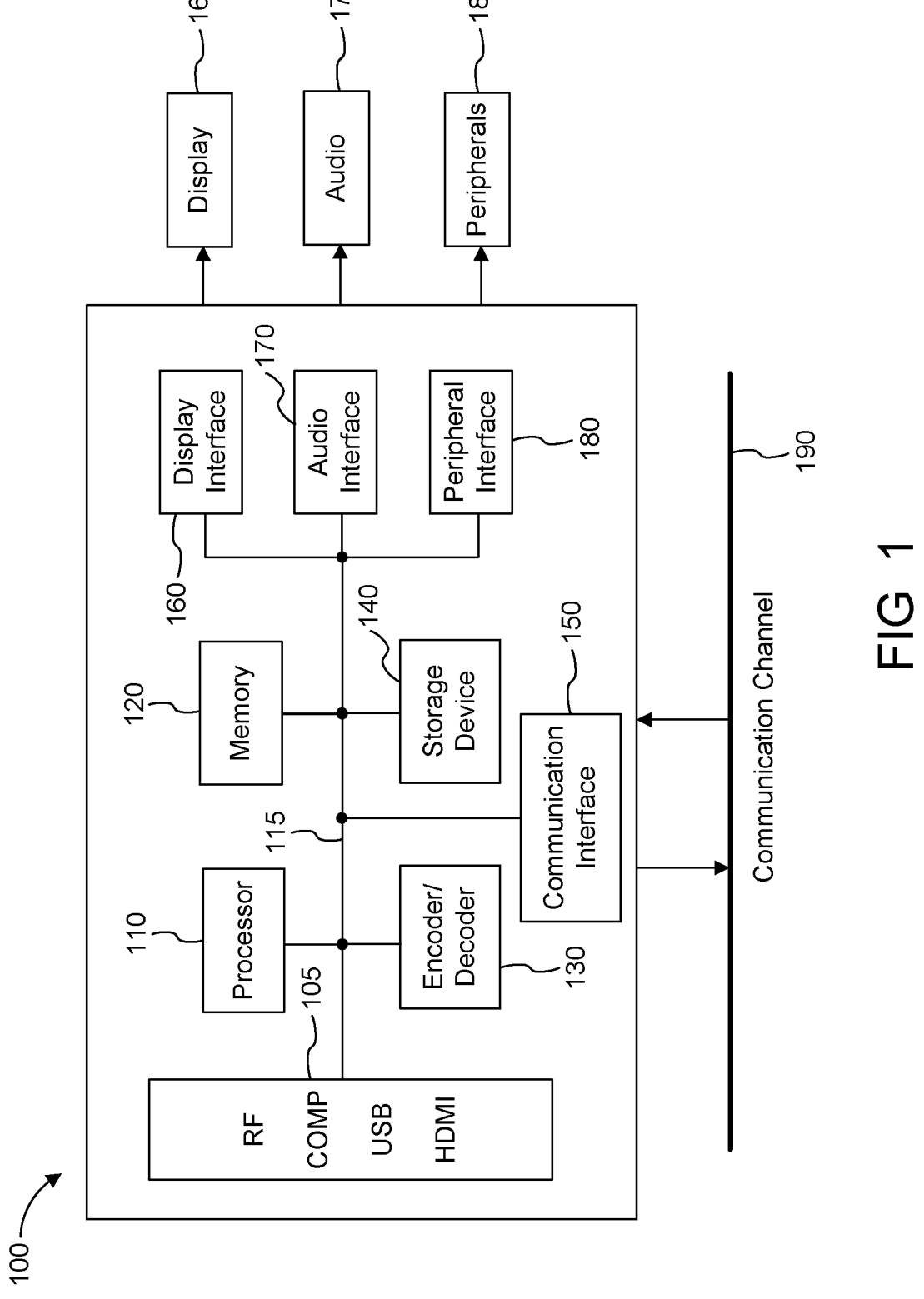
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the data stream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
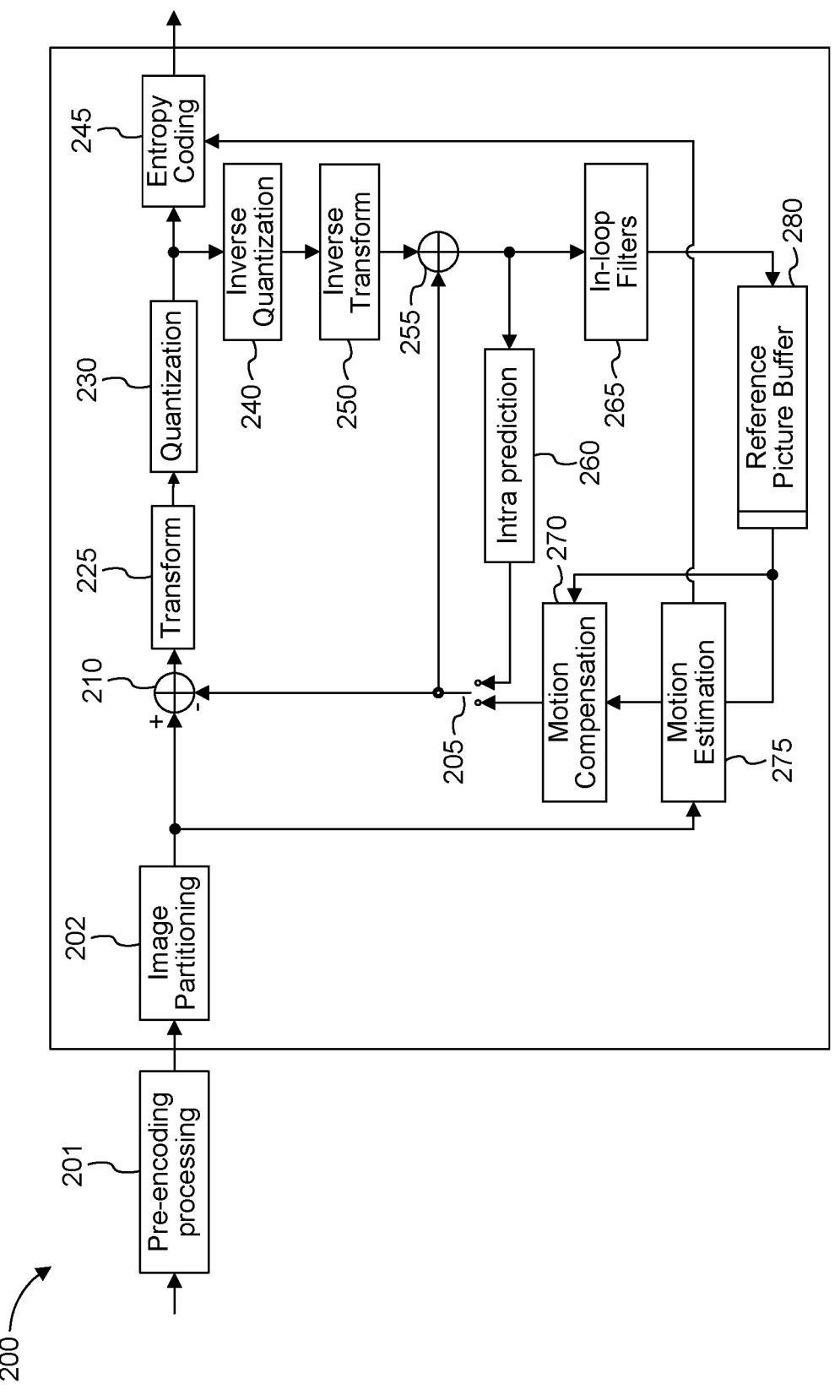
FIG. 2 illustrates a block diagram of an embodiment of a video encoder.

FIG. 2 illustrates an example video encoder 200, such as a High Efficiency Video Coding (HEVC) encoder. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260) using neighboring reconstructed samples. In an inter mode, motion estimation (275) and compensation (270) are performed. The encoder decides (205) which one of the intra mode or inter mode to use for encoding the unit, and indicates the intra/inter 20) decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
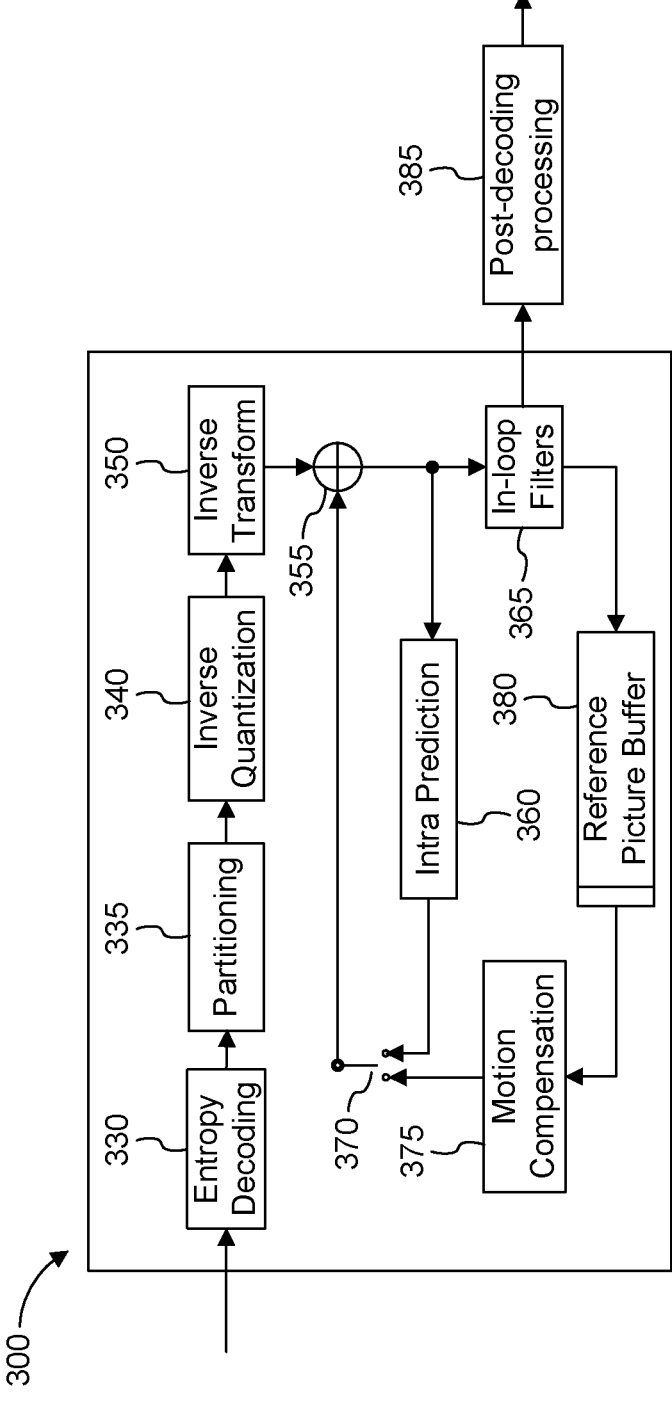
FIG. 3 illustrates a block diagram of an embodiment of a video decoder.

FIG. 3 illustrates a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block can be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

In various embodiments, for video coding, bi-prediction motion vectors are decoder side refined while illumination may vary locally and temporally. Bi-prediction technique is a basic tool being used in hybrid video coding. Bi-prediction technique is built as an average of two uni-predictions, leading to more stable signal prediction, reducing coding artefacts and compensating for consistent temporal illumination change intrinsically. When no illumination change occurs, Decoder side Motion Vector Refinement (DMVR) technique allows improving the regular bi-prediction technique by, for example, reducing the amount of syntax while refining the motion locally. However, the DMVR is not compatible with local illumination change in general.

In current implementations, a Local Illumination Compensation (LIC) tool performs local illumination compensation by weighting the prediction signal, a weighted prediction (WP) tool performs global illumination compensation, and a bi-prediction weight (BPW) tool allows un-equal bi-prediction average weighting. In current implementations, all these tools (e.g., LIC, WP, bi-prediction with CU-level weights (BCW) or BPW) are not compatible with DMVR.

Illumination Compensation Tools

Weighted Prediction (WP)

In some examples, the weighted prediction (WP) allows defining weights and offsets ($w_i$; $off_i$) explicitly, per group of CTUs (e.g., slice and/or picture). The weights are associated to each component of each reference picture "i" of each list (L0 and L1) stored in a Decoded Picture Buffer (DPB) and are applied onto the block prediction.

The weights and offsets are generally coded in a high-level syntax (HLS) which is common for a group of blocks. For example, the weights and offsets may be coded in a slice header or a picture header and may be fixed for a slice. WP may apply both for uni-directional prediction (Eq. 1) or bi-prediction (Eq. 2). If a current CU is coded in uni-directional with reference $refIdx_0$ of list L0, one denotes ($w_0$; $off_0$) the weight and offset associated to $refIdx_0$:

Uni-directional Prediction $$Pred_0' = ((w_0 \cdot Pred_0[x] + (1 \ll (shift - 1))) \gg shift) + off_0 \qquad \text{(Eq. 1)}$$

Bi-Prediction $$Pred_{01}' = ((w_0 \cdot Pred_0[x] + w_1 \cdot Pred_1[x] + off_{01}) \gg (shift + 1) \qquad \text{(Eq. 2)}$$

$$\text{with: } off_{01} = (off_0 + off_1 + 1) \ll shift$$

Bi-Prediction with CU-Level Weight (BCW or BPW)

In VVC, a bi-prediction mode is extended beyond simple averaging (e.g., bi-prediction average, 740 in FIG. 7) to allow weighted averaging (e.g., 745 in FIG. 7) of the two prediction signals.

$$P_{bi-pred} = ((8 - w) * P_0 + w * P_1 + 4) \gg 3 \qquad \text{(Eq. 3)}$$

Five weights may be allowed in the weighted averaging bi-prediction, $w \in \{-2, 3, 4, 5, 10\}$. A regular simple averaging corresponds to w=4. The number of weights used may depend on a respective configuration and/or condition. For example, for low-delay pictures, all five weights are used. For non-low-delay pictures, three weights ($w \in \{3, 4, 5\}$) are used. In an example, a BCW weight index (e.g., an index indicating which weight to use) is coded per CU (e.g., in a non-merge mode). In another example, the BCW weight index is derived from one or more reconstructed neighboring CUs (e.g., in a merge mode).

Local Illumination Compensation (LIC)

Figure 4:
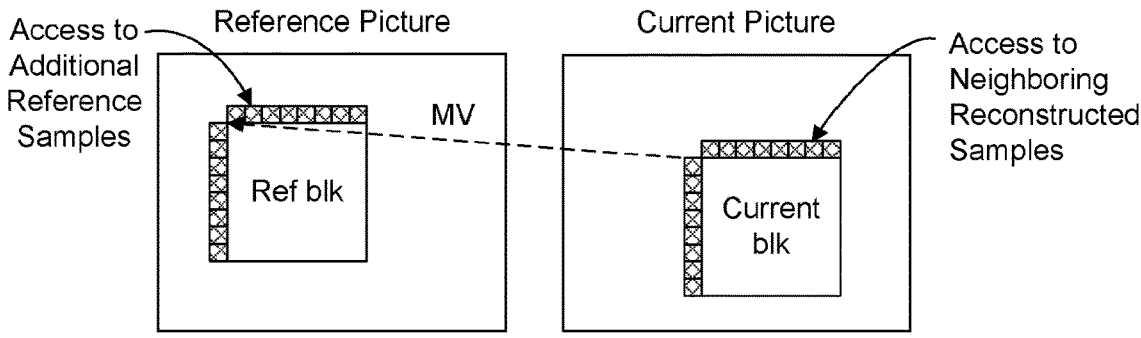
FIG. 4 illustrates a block diagram of an embodiment of deriving LIC parameters from neighboring reconstructed samples and the corresponding reference samples translated with MV.

A Local Illumination Compensation (LIC) allows compensating a block prediction with dedicated LIC parameters. An LIC tool may be enabled in the HLS and is also signaled at the block level or derived from reconstructed neighboring CUs in case of a merge mode. In an example, an LIC flag (e.g., a flag or indication that indicates whether the LIC tool applies for a current CU) may be coded at the block level. In another example, the LIC flag or LIC indication may be derived from one or more reconstructed neighboring CUs. If the LIC tool applies, a set of LIC parameters are derived. Referring to FIG. 4, for example, when LIC is activated for a current block, a decoder computes some LIC parameters based on 1) some reconstructed picture samples, localized on the left and/or on the top (e.g., L-shape) of the current block to be predicted, and 2) some reference picture samples, localized on the left and/or on the top of the motion compensated block. Still referring to FIG. 4, in a joint exploration model (JEM), LIC parameters are derived from neighboring reconstructed samples and the corresponding reference samples translated with motion vector (MV).

The LIC tool or model may be based on a simple linear correction applied on a regular current block prediction (e.g., as shown in Eq. 4):

$$Y_{corr}(x) = ((a \cdot Y_{pred}(x) + (1 \ll (shift - 1))) \gg shift) + b \qquad \text{(Eq. 4)}$$

where: $Y_{pred}(x)$ is the prediction sample value situated at position $x$, $Y_{corr}(x)$ is the corrected prediction sample value situated at position $x$, and $(a, b)$ are the LIC parameters.

For bi-prediction, the LIC model may include three parameters ($a_0$, $a_1$, b) and the LIC correction is:

$$Y_{corr}(x) = ((a_0 \cdot Y_{pred0}(x) + a_1 \cdot Y_{pred0}(x) + (1 \ll (\text{shift} - 1))) \gg \text{shift}) + b \qquad \text{(Eq. 4b)}$$

The state-of-art includes several methods to derive the LIC parameters from the reconstructed and reference samples, for example, based on a mean square minimization method.

In some implementations (e.g., Enhanced Compression Model (ECM)), LIC is disabled for bi-prediction.

Motion Refinement Tools

Bi-Directional Optical Flow (BDOF)

In Versatile Video Coding (VVC), a bi-directional optical flow (BDOF) tool is applied to the luma component. The BDOF tool or mode is based on an optical flow equation concept (as shown in Eq. 5), which assumes that the motion of an object is smooth and its luminance is constant along the considered time interval. In some cases, to simplify the equations, the temporal variation is supposed to be zero.

$$\partial I / \partial t + V_X \cdot \partial I / \partial x + V_Y \cdot \partial I / \partial y = 0 \qquad \text{(Eq. 5)}$$

Figure 5:
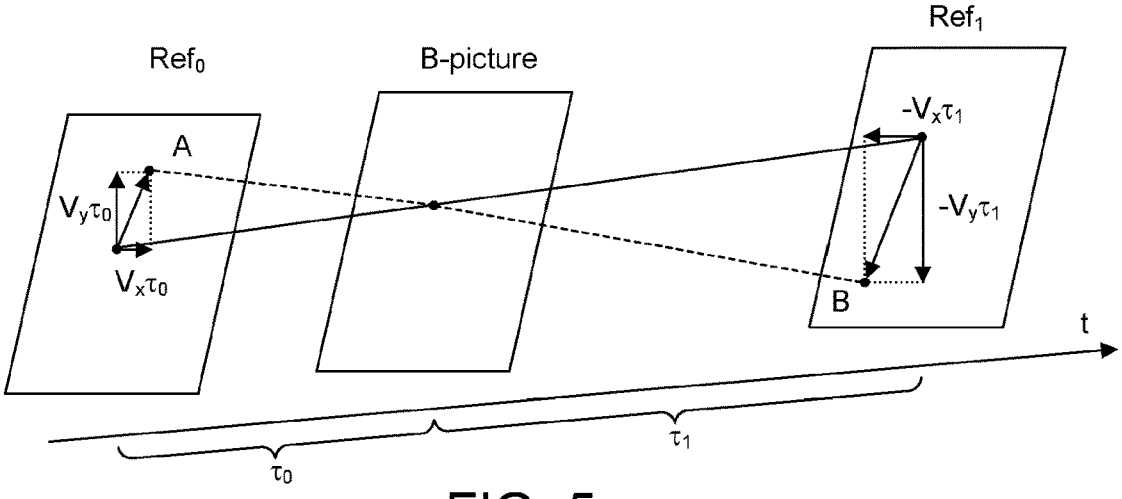
FIG. 5 illustrates a process of an embodiment of using bi-directional optical flow (BDOF).

In an example, for each 4×4 subblock, a motion refinement is calculated by minimizing the difference between the L0 and L1 prediction samples. The motion refinement is then used to adjust the bi-predicted sample values in the 4×4 subblock, assuming linear displacement in-between the two reference pictures and based on Hermite's interpolation of the optical flow, for example, as shown in FIG. 5.

In a variant, the motion refinement may be conducted by adding offsets correction on the prediction samples (shown in 730 of FIG. 7) after motion compensation.

In VVC and ECM, BDOF is disabled when any of LIC, WP or BCW is enabled.

Decoder-Side Motion Vector Refinement (DMVR)

In VVC, the accuracy of MVs in a merge mode is increased using a bilateral-matching (BM)-based decoder-side motion vector refinement applied in bi-prediction. A refined MV is searched around two initial MVs ($MV_0$ and $MV_1$) in a reference picture list L0 and a reference picture list L1. The refined MVs are derived around the initiate MVs based on the minimum bilateral matching cost between the two reference blocks in L0 and L1. BM performs local search to derive integer sample precision intDeltaMV refinement symmetrically for predictions 0 and 1.

Figure 6:
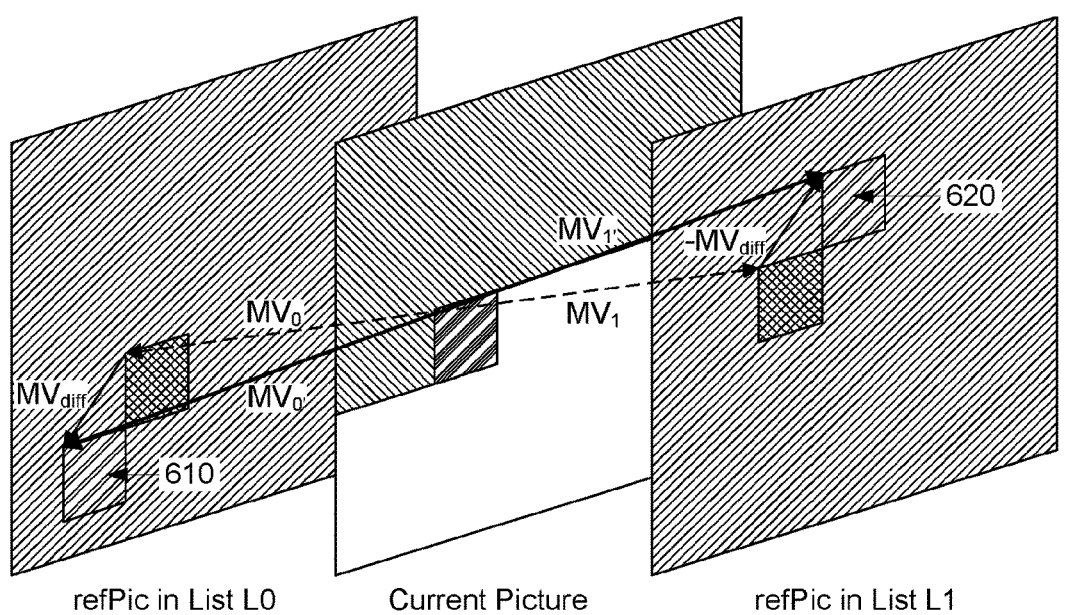
FIG. 6 illustrates a process of an embodiment of using decoder-side motion vector refinement to generate a bi-predicted signal.

Referring to FIG. 6, the sum of absolute differences (SAD) (between blocks 610 and 620) based on each MV candidate around the initial MV is calculated. The MV candidate with the lowest SAD becomes the refined MV and would be used to generate the bi-predicted signal. In ECM, SAD is replaced with a cost function taking into account the refinement (intDeltaMv) around the initial MVs (e.g., as shown in Eq. 6):

$$bilCost = mvDistanceCost + sadCost \qquad \text{(Eq. 6)}$$

In ECM, in case of large CUs (e.g., a size larger than 64), the SAD is replaced with Mean Removed SAD (MRSAD)

that is used/applied to remove the DC effect of distortion between two (or more) reference blocks.

In VVC, sub-pel refinement may be derived via interpolation in parametric error surface based sub-pixel offsets estimation. In an example, the center position cost and the costs at four neighboring positions from the center are used to fit a two-dimensional (2-D) parabolic error surface equation.

In VVC, the application of DMVR is restricted and is only applied for the CUS which are coded with one or more (or all of) following modes and features (e.g., see DMVR conditions, 702 in FIG. 7):

CU level merge mode with bi-prediction MV;

One reference picture is in the past and another reference picture is in the future with respect to the current picture. The distances (e.g., POC difference) from two reference pictures to the current picture are same;

Both reference pictures are short-term reference pictures;

CU has more than 64 luma samples;

Both CU height and CU width are larger than or equal to 8 luma samples;

BCW weight index indicates an equal weight (or BCW tool is disabled);

WP is not enabled for the current block; and/or

CIIP mode is not used for the current block.

In ECM, DMVR is disabled when LIC is enabled. The decoder side motion vector refinement is carried out in three steps (e.g., refer to FIG. 7) or any subset or combination of the three steps. In a first pass/step, a refined MV is derived by applying BM to a coding block as depicted above (710). In a second pass/step, a refined MV is derived by applying BM to a 16×16 grid subblock (715). In the third step, the refined MV is derived by applying BDOF to an 8×8 grid subblock. For each 8×8 subblock, BDOF refinement is applied (740). In an example, a list of MV candidates for DMVR is built from (or based on, or derived from) one or more reconstructed neighboring blocks with associated BCW weights set to equal weights. An index identifying which candidate (e.g., MV candidate) of the list of MV candidates to be used may be coded. For example, the index (identifying which candidate to be used to decode a current block) is coded for the current block.

Figure 7:
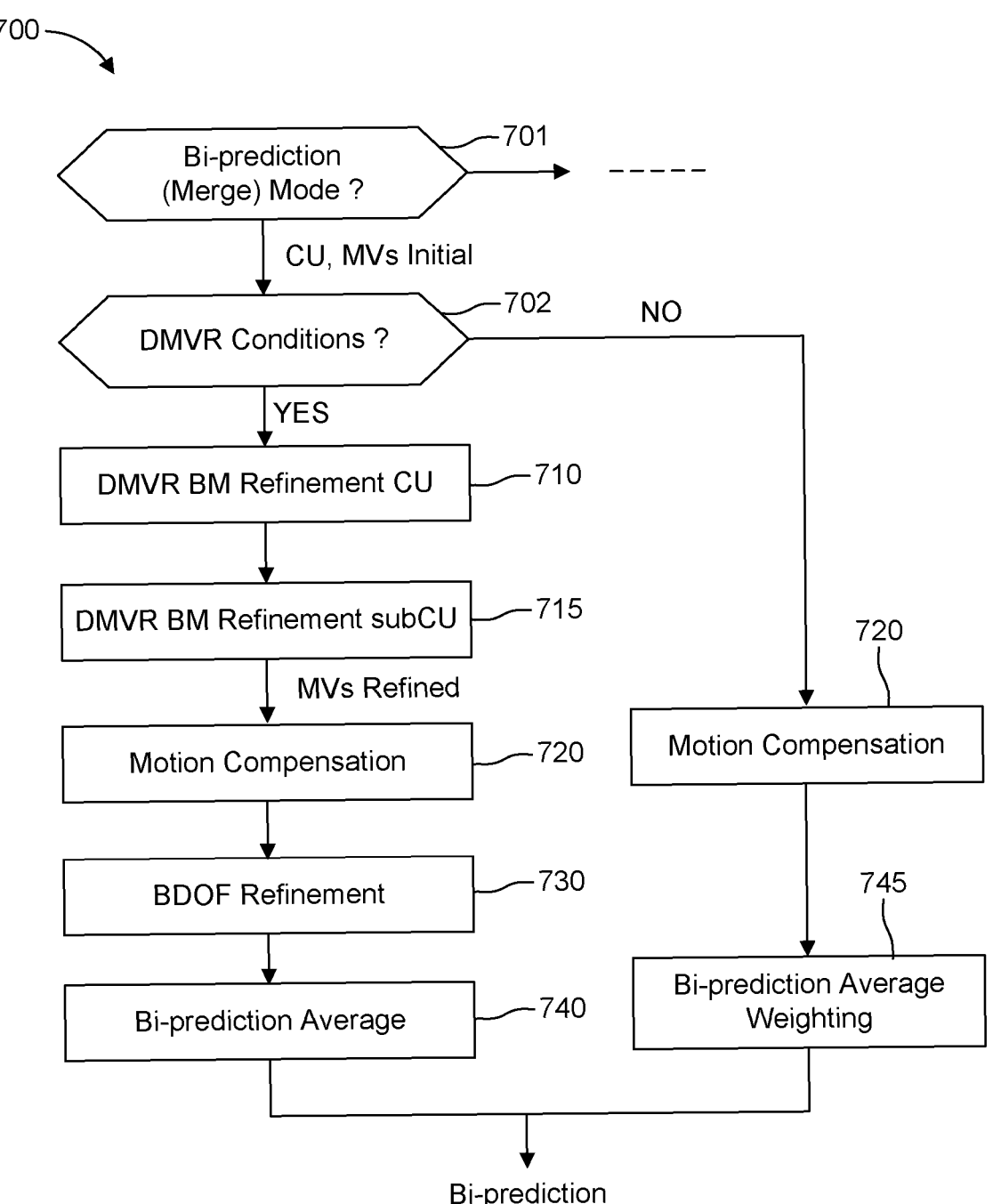
FIG. 7 illustrates a process of an embodiment of using DMVR and BDOF to generate a bi-predicted signal.

In ECM, referring to FIG. 7, an overall process 700 using DMVR and BDOF synoptic is provided. In one embodiment, the process 700 includes decoder-side motion vector refinement, and some variants of DMVR may be based on simplifying the process 700 by removing one or more steps or operations, for example, step/operation 715 and/or step/operation 730.

In various embodiments, a DMVR tool may improve the bi-prediction coding performance. However, in some cases of illumination change(s), for example, an illumination change carried out with any of LIC, BCW or WP tools, the DMVR motion refinement may not be applied since it is based on constant illumination assumption. In other words, in current implementations, if the DMVR tool is to be applied, none of the LIC, BCW or WP tools could be enabled. In current implementations of VVC or ECM, the DMVR tool is disabled for CU coded with LIC, WP or BCW not equal to default equal weights. As such, in video coding, it is desired to modify DMVR so that DMVR can apply with weighted prediction tools such as LIC, WP or BCW, for example.

In an example, the impacted codec module may include coding module 245, 270, 275 in FIG. 2, and/or 330, 375 in FIG. 3.

In some current VVC and ECM designs, the DMVR algorithm assumes no illumination change in the scene. One proposes to adapt DMVR so that it is more robust to (local) illumination changes and is compatible with other tools including bi-prediction blending.

DMVR Motion Refinement Based on Gradients for IC/Weighting Modes

In one embodiment, to be more robust to illumination changes, the DMVR is adapted so that it can be applied to modes with illumination change (e.g., IC modes). Then an operation of DMVR enabling restriction (see, e.g., DMVR conditions 702 in FIG. 7) may remove tool restrictions (e.g., LIC tool restrictions). These tools/modes (e.g., LIC tools/modes) may include at least one of the following modes (or conditions): 1) BCW weight index indicates non-equal weights, 2) LIC is enabled (e.g., LIC flag is true), and/or 3) WP is enabled for the current block.

In an example, the DMVR adaptation may be performed in one or more operations discussed herein. In case of a mode with illumination change, the step 1 and step 2 of DMVR are modified so that they use a distortion metric less sensitive to illumination change than SAD, and can be applied to any CU size. In an example, the SAD is replaced with MRSAD. The Selection between SAD and MRSAD may be based on 1) a CU size, and/or 2) enablement of at least one of BCW, LIC, or WP tools for the current block.

Exemplary equations used for SAD, MRSAD, and SAD computed with gradients, are provided herein:

SAD (Sum of Absolute Differences):

$$P_0(x) = \sum_{x \in block} Iref_0(x + mv_0 + mv_{diff})$$

$$P_1(x) = \sum_{x \in block} Iref_1(x + mv_1 - mv_{diff})$$

$$SAD = \sum_{x \in block} |P_0(x) - P_1(x)|$$

MRSAD (Mean Removed SAD):

$$avg_{diff} = \frac{1}{N_{block}} \sum_{x \in N_{block}} (P_0(x) - P_1(x))$$

$$MRSAD = \sum_{x \in block} |P_0(x) - P_1(x) - avg_{diff}|$$

SAD computed with gradients:

$$grad_0(x, y) = abs(P_0(x, y) - P_0(x + 1, y)) + abs(P_0(x, y) - P_0(x, y + 1))$$

$$grad_1(x, y) = abs(P_1(x, y) - P_1(x + 1, y)) + abs(P_1(x, y) - P_1(x, y + 1))$$

$$SAD_G = \sum_{(x,y) \in block} |grad_0(x, y) - grad_1(x, y)|$$

In another example, the gradients in the L0 and L1 predictions are extracted, and the SAD is computed with these gradient samples. For example (Eq. 7):

$$grad\_LX[x, y] = abs(pred\_LX[x, y] - pred\_LX[x + 1, y]) + \qquad \text{(Eq. 7)}$$

$$abs(pred\_LX[x, y] - pred\_LX[x, y + 1])$$

$$\text{where: } LX = \{L0, L1\}.$$

In one example, the BDOF is not applied in case of mode with illumination change or if BCW weights are non-equal (e.g., each respective BCW weight is different).

In another example, the DMVR motion refinement (based on gradients for IC/Weighting modes) is conditioned with a current CU size. In an example, if a CU size (e.g., the current CU size) is smaller than (or equal to) a threshold, the DMVR adaptation is enabled/performed, otherwise a regular DMVR is applied. In another example, if a CU size (e.g., the current CU size) is larger than (or equal to) a threshold, the DMVR adaptation is enabled/performed, otherwise a regular DMVR is applied.

Applying Bi-Prediction Weighting with Refined MV(s)

In one embodiment, once the MV have been refined, the bi-prediction weighting using the inherited un-equal BPW (or BCW) weights may be applied (e.g., Eq. 3). In an example, the bi-prediction weighting using the inherited un-equal BPW (BCW) weights can be combined with the DMVR motion refinement (based on gradients for IC/Weighting modes) for the derivation of refined MVs. In one embodiment, when building (generating or determining) a list of MV candidates for applying DMVR, the associated inherited BPW (or BCW) weights may be un-equal. For example, each value of a respective BPW (or BCW) pair of weights is different. In this example, each candidate of the list of candidates comprises one or more MVs (e.g., a pair of MVs), and each candidate is associated with a pair of (BPW or BCW) weights ($w_0$; $w_1$), where $w_0$ may be different from $w_1$.

In case of LIC flag is true, the LIC parameters may be derived (e.g., in a traditional way) and the LIC weighting is applied (Eq. 4b). In case of WP is enabled, the regular WP weighting may be applied to form the final bi-prediction. In case of BPW, the BPW weight index may be inherited (e.g., a merge mode).

In an example, the bi-prediction weighting with refined MV may be conditioned with the current CU size. In an example, if a CU size (e.g., the current CU size) is smaller than (or equal to) a threshold, a (non-equal) weighting is enabled/performed, otherwise a regular DMVR is applied. In another example, if a CU size (e.g., the current CU size) is larger than (or equal to) a threshold, a (non-equal) weighting is enabled/performed, otherwise a regular DMVR is applied.

Deriving Bi-Prediction Weighting Parameters with DMVR

In merge mode, a BCW weight index and a LIC flag are derived from the neighboring reconstructed CUs.

In one embodiment, similarly to LIC, one proposes to derive the BCW weight index based on the reconstructed samples and reference samples localized on the left and/or on the top (L-shape) of the current block and reference block respectively, as depicted in FIG. 4. For this purpose, ref_L0[ ] and ref_L1[ ] refer to the samples of the reference pictures L0 and L1, and rec[ ] refers to the reconstructed samples of the current picture, and (mv0, mv1) refer to the motion vectors associated with current block. The L0 and L1 prediction samples are P0[x]=ref_L0[x+mv0] and P1[x]=ref_L1[x+mv1].

In an example, in case of sub-pel motion vector, the values of ref_L0[ ] and ref_L1[ ] may be interpolated with regular motion compensation filtering process.

Given a BCW index corresponding to weight parameter w, the bi-prediction $P_{bi}$ is computed with Eq. 3. For the values of x corresponding to the L-shape of the current block, w may be derived as the value minimizing distortion with rec[ ]. For example, w may be derived as the following:

$$\min_{w \in \{-2,3,4,5,10\}} \sum_{x \in L-shape} |P_{bi}(x) - rec[x]| \text{ or}$$

$$\min_{w \in \{-2,3,4,5,10\}} \sum_{x \in L-shape} (P_{bi}(x) - rec[x])^2$$

In an example, the refining of BCW weight is made only if the value of the inherited weight index corresponds to non-equal weight. In another case, the refining of BCW weight is carried out if LIC flag is true and the Eq. 3 (BPW equation) is used in place of traditional LIC equation.

In another example, if the LIC flag is true, the LIC parameters are derived as usual and the LIC weighting is applied (see Eq. 4b).

In an example, the derivation of the BCW weight or LIC parameters is conditioned with the current CU size. For example, if a CU size (e.g., the current CU size) is smaller than (or equal to) a threshold, then the derivation of the BCW weight or LIC parameters is performed or used, otherwise default weights are used. In another example, if a CU size (e.g., the current CU size) is larger than (or equal to) a threshold, then the derivation of the BCW weight or LIC parameters is performed or used, otherwise default weights are used. In an example, if a CU size (e.g., the current CU size) is smaller than (or equal to) a threshold, the inherited value of the BCW weights is used. In another example, if a CU size (e.g., the current CU size) is larger than (or equal to) a threshold, the inherited value of the BCW weights is used.

In an example, in a merge mode, the L-shape is adapted as a function of the position of the inherited parameters. If the inherited parameters come from block situated on top of current block only, the L-shape is made of reconstructed samples and reference samples localized on the top of current block, and if the inherited parameters come from block situated on the left of current block only, the L-shape is made of reconstructed samples and reference samples localized on the left of current block.

Representative Procedures for Video/Image Coding Using Decoder-Side Motion Vector Refinement (DMVR)

Various embodiments disclosed herein are related to using decoder side motion vector refinement (DMVR) technique with bi-prediction weighting for video (or image) coding are provided. In one embodiment, a method for video coding includes determining a mode with an illumination change, determining that at least one coding tool for a block is enabled, and performing a DMVR process based on i) the mode with the illumination change and/or ii) the at least one coding tool for the block being enabled. In an example, the DMVR process may include selecting, based on a coding unit (CU) size and/or the at least one coding tool for the block being enabled, between a sum of absolute differences (SAD) and a mean removed SAD (MRSAD). In some cases, the DMVR process comprises selecting to use a MRSAD based on a BPW weight index indicating non-equal weights. In an example, the at least one coding tool comprises any of: a bi-prediction weight (BPW) tool, a local illumination compensation (LIC) tool, or a weighted prediction (WP) tool.

In some examples, the DMVR process includes selecting between a sum of absolute differences (SAD) and 2) a mean removed SAD (MRSAD) based on a coding unit (CU) size, and/or the enabled coding tool. For example, if a BPW weight index indicates non-equal weights, the DMVR process comprises selecting to use MRSAD instead of using SAD. In another example, if a bi-prediction weight (BPW) tool is enabled, the DMVR process comprises selecting to use bi-prediction average weighting instead of using bi-prediction average.

In various embodiments, one or more coding tools for the block (e.g., the current block) being enabled are determined based on any of: 1) a bi-prediction weight (BPW) weight index indicating non-equal weights; 2) a local illumination compensation (LIC) being enabled or an LIC flag being true; or 3) a weighted prediction (WP) being enabled for the block.

In one embodiment, the method for video coding discussed above may include extracting gradients in reference picture predictions; and computing a sum of absolute differences (SAD) using the extracted gradients.

In one embodiment, the method for video coding discussed above may include a bi-directional optical flow (BDOF) tool that is not applied based on the mode with the illumination change.

In one embodiment, the method for video coding discussed above may include performing a DMVR adaptation based on a determination that a current coding unit (CU) size is smaller than or equal to a threshold.

In another embodiment, the method for video coding discussed above may include performing a DMVR adaptation based on a determination that a current coding unit (CU) size is larger than or equal to a threshold.

In one embodiment, the method for video coding discussed above may include applying a bi-prediction weighting with refined motion vector (MV).

In one embodiment, the method for video coding discussed above may include deriving bi-prediction weighting parameters with the DMVR process.

In one embodiment, an apparatus for video coding may include an encoder and/or a decoder, and the encoder and/or the decoder may include one or more processors configured to determine a mode with an illumination change, to determine that at least one coding tool for a block is enabled, and to perform a DMVR process based on the mode with the illumination change and the at least one coding tool for the block being enabled. In an example, the one or more processors may be configured to select, based on a CU size and/or the at least one coding tool for the block being enabled, between an SAD and an MRSAD. In an example, the one or more processors may be configured to select to use MRSAD based on a BPW weight index indicating non-equal weights. In some cases, at least one coding tool comprises any of: a bi-prediction weight (BPW) tool, a local illumination compensation (LIC) tool, or a weighted prediction (WP) tool.

In an example, the at least one coding tool comprises a BPW tool, and the one or more processors are configured to select to use bi-prediction average weighting based on the BPW tool being enabled.

In another example, when determining that the at least one coding tool for the block is enabled, the one or more processors are configured to determine: 1) a bi-prediction weight (BPW) weight index indicating non-equal weights; 2) a local illumination compensation (LIC) being enabled or an LIC flag being true; or 3) a weighted prediction (WP) being enabled for the block.

In various embodiments, DMVR conditions are modified to include BPW candidates. In an example, a DMVR process is modified to enable use of bi-prediction average weighting in place of using bi-prediction average if BPW is enabled. In another example, a DMVR refinement process is modified to use MRSAD in place of SAD if BPW weights are un-equal.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the impacted codec module may include coding module 245, 270, and/or 275 of a video encoder 200 as shown in FIG. 2, and/or coding module 330, 375 of a decoder 300 as shown in FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

Note that the syntax elements used herein are descriptive terms. As such, they do not preclude the use of other syntax element names.

This disclosure has described various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into one or more of the following:

a. SDP (session description protocol), a format for describing multimedia communication sessions for the purposes of session announcement and session invita-tion, for example as described in RFCs and used in conjunction with RTP (Real-time Transport Protocol) transmission.

b. DASH MPD (Media Presentation Description) Descriptors, for example as used in DASH and transmitted over HTTP, a Descriptor is associated to a Representation or collection of Representations to provide additional characteristic to the content Representation.

c. RTP header extensions, for example as used during RTP streaming.

d. ISO Base Media File Format, for example as used in OMAF and using boxes which are object-oriented building blocks defined by a unique type identifier and length also known as 'atoms' in some specifications.

e. HLS (HTTP live Streaming) manifest transmitted over HTTP. A manifest can be associated, for example, to a version or collection of versions of a content to provide characteristics of the version or collection of versions.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

What is claimed is:

1. A method for coding video data, comprising:
adapting a decoder-side motion vector refinement (DMVR) process to coding tools with an illumination change, wherein, for a block, the DMVR process includes:
determining that at least one coding tool, of the coding tools, is enabled; and performing the DMVR process, wherein a distortion metric is selected based on the at least one coding tool.

2. The method of claim 1, wherein the
selection of the distortion metric is between a sum of absolute differences (SAD) and a mean removed SAD (MRSAD).

3. The method of claim 1, wherein the at least one coding tool is a bi-prediction weight (BPW) tool, and wherein the selected distortion metric
is a mean removed SAD (MRSAD) based on a BPW weight index indicating non-equal weights.

4. The method of claim 1, wherein the at least one coding tool comprises any of:
a bi-prediction weight (BPW) tool, a local illumination compensation (LIC) tool, or a weighted prediction (WP) tool.

5. The method of claim 1, wherein the at least one coding tool comprises a bi-prediction weight (BPW) tool and wherein a BPW weight index is inherited.

6. The method of claim 1, wherein the at least one coding tool for the block being enabled is determined based on any of:
a bi-prediction weight (BPW) weight index indicating non-equal weights,
a local illumination compensation (LIC) being enabled or an LIC flag being true, or
a weighted prediction (WP) being enabled for the block.

7. The method of claim 1, further comprising:
extracting gradients in reference picture predictions; and
computing a sum of absolute differences (SAD) using the extracted gradients.

8. The method of claim 1, wherein a bi-directional optical flow (BDOF) tool is not applied based on the at least one coding tool with the illumination change.

9. The method of claim 1, further comprising:
performing a DMVR adaptation based on a determination that a current coding unit (CU) size is smaller than or equal to a threshold.

10. The method of claim 1, further comprising:
performing a DMVR adaptation based on a determination that a current coding unit (CU) size is larger than or equal to a threshold.

11. The method of claim 1, further comprising applying a bi-prediction weighting with refined motion vector (MV).

12. The method of claim 1, further comprising deriving bi-prediction weighting parameters with the DMVR process.

13. An apparatus for coding video data, comprising:
at least one processor; and
memory storing instructions that, when executed by the at least one processor, cause the apparatus to:
adapt a decoder-side motion vector refinement (DMVR) process to coding tools with an illumination change, wherein, for a block, the DMVR process includes:
determining that at least one coding tool, of the coding tools, is enabled, and
performing the DMVR process wherein a distortion metric is selected based on the at least one coding tool.

14. The apparatus of claim 13, wherein the
selection of the distortion metric is between a sum of absolute differences (SAD) and a mean removed SAD (MRSAD).

15. The apparatus of claim 13, wherein the at least one coding tool is a bi-prediction weight (BPW) tool, and wherein the selected distortion metric is a mean removed SAD (MRSAD) based on a BPW weight index indicating non-equal weights.

16. The apparatus of claim 13, wherein the at least one coding tool comprises any of:

a bi-prediction weight (BPW) tool, a local illumination compensation (LIC) tool, or a weighted prediction (WP) tool.

17. The apparatus of claim 13, wherein the at least one coding tool comprises a bi-prediction weight (BPW) tool, and wherein a BPW weight index is inherited.

18. The apparatus of claim 13, wherein, when determining that the at least one coding tool for the block is enabled, the instructions further cause the apparatus to determine:

a bi-prediction weight (BPW) weight index indicating non-equal weights;

a local illumination compensation (LIC) being enabled or an LIC flag being true; or a weighted prediction (WP) being enabled for the block.

19. The apparatus of claim 13, wherein the instructions further cause the apparatus to:

extract gradients in reference picture predictions; and compute a sum of absolute differences (SAD) using the extracted gradients.

20. The apparatus of claim 13, wherein a bi-directional optical flow (BDOF) tool is not applied based on the at least one coding tool with the illumination change.

21. The apparatus of claim 13, wherein the instructions further cause the apparatus to:

perform a DMVR adaptation based on a determination that a current coding unit (CU) size is smaller than or equal to a threshold.

22. The apparatus of claim 13, wherein the instructions further cause the apparatus to:

perform a DMVR adaptation based on a determination that a current coding unit (CU) size is larger than or equal to a threshold.

23. The apparatus of claim 13, wherein the instructions further cause the apparatus to:

apply a bi-prediction weighting with refined motion vector (MV).

24. The apparatus of claim 13, wherein the instructions further cause the apparatus to:

derive bi-prediction weighting parameters with the DMVR process.

* * * * *